(12) United States Patent
Damson et al.

(10) Patent No.: US 8,441,818 B2
(45) Date of Patent: May 14, 2013

(54) METHOD AND DEVICE FOR OPTIMIZING A SPACE VECTOR PULSE WIDTH MODULATION

(75) Inventors: Mark Damson, Stuttgart (DE); Gunther Goetting, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 255 days.

(21) Appl. No.: 12/737,352

(22) PCT Filed: May 29, 2009

(86) PCT No.: PCT/EP2009/056599
§ 371 (c)(1),
(2), (4) Date: Mar. 8, 2011

(87) PCT Pub. No.: WO2010/000548
PCT Pub. Date: Jan. 7, 2010

(65) Prior Publication Data
US 2011/0149621 A1 Jun. 23, 2011

(30) Foreign Application Priority Data
Jul. 3, 2008 (DE) .......................... 10 2008 040 144

(51) Int. Cl.
*H02M 7/5387* (2007.01)
(52) U.S. Cl.
USPC ................... 363/41; 363/17; 363/43; 363/97; 363/98; 363/131; 363/132

(58) Field of Classification Search ................... 363/17, 363/41, 43, 97, 98, 131, 132
See application file for complete search history.

(56) References Cited

U.S. PATENT DOCUMENTS

| 5,910,892 A * | 6/1999 | Lyons et al. .................... 363/98 |
| 6,541,933 B1 * | 4/2003 | Leggate et al. ............... 318/599 |
| 6,643,149 B2 * | 11/2003 | Arnet et al. .................... 363/41 |
| 6,653,812 B1 * | 11/2003 | Huo et al. ...................... 318/801 |
| 7,075,267 B1 * | 7/2006 | Cheng ........................... 318/807 |
| 7,499,296 B2 * | 3/2009 | Baudesson et al. ............. 363/37 |
| 7,558,089 B2 * | 7/2009 | Mese et al. ...................... 363/52 |
| 7,791,304 B2 * | 9/2010 | Pirozzi et al. ................. 318/599 |
| 2006/0138994 A1 * | 6/2006 | Cheng ........................... 318/807 |
| 2008/0174260 A1 * | 7/2008 | D'Angelo et al. ............ 318/650 |
| 2008/0180095 A1 * | 7/2008 | D'Angelo et al. ............ 324/234 |
| 2008/0258673 A1 * | 10/2008 | Welchko et al. .............. 318/811 |

FOREIGN PATENT DOCUMENTS
WO WO 2008/035544 3/2008

\* cited by examiner

*Primary Examiner* — Bao Q Vu
(74) *Attorney, Agent, or Firm* — Kenyon & Kenyon LLP

(57) ABSTRACT

In a method for optimizing a space vector pulse width modulation, a voltage is connected to a load, by combining discrete switching states of a plurality of switches to control the load, the load being switched to zero potential by two of the switching states. In the case the maximum degree of control is increased, during a pulse width modulation period, at least one of the switching states, that switches to zero potential, is omitted.

5 Claims, 2 Drawing Sheets

| Zustand | Eingeschaltete Schalter | U Strang 1 | U Strang 2 | U Strang 3 | Space Vector |
|---|---|---|---|---|---|
| 0 | T2, T4, T6 | 0 | 0 | 0 | 000 |
| 1 | T1, T4, T6 | 2/3 $U_z$ | -1/3 $U_z$ | -1/3 $U_z$ | 100 |
| 2 | T1, T3, T6 | 1/3 $U_z$ | 1/3 $U_z$ | -2/3 $U_z$ | 110 |
| 3 | T2, T3, T6 | -1/3 $U_z$ | 2/3 $U_z$ | -1/3 $U_z$ | 010 |
| 4 | T2, T3, T5 | -2/3 $U_z$ | 1/3 $U_z$ | 1/3 $U_z$ | 011 |
| 5 | T2, T4, T5 | -1/3 $U_z$ | -1/3 $U_z$ | 2/3 $U_z$ | 001 |
| 6 | T1, T4, T5 | 1/3 $U_z$ | -2/3 $U_z$ | 1/3 $U_z$ | 101 |
| 7 | T1, T3, T5 | 0 | 0 | 0 | 111 |

METHOD AND DEVICE FOR OPTIMIZING A SPACE VECTOR PULSE WIDTH MODULATION

BACKGROUND OF THE INVENTION

1. Field of the Invention

The present invention relates to a method for optimizing a space vector pulse width modulation, in which a voltage is connected to a load by combining discrete switching states of a plurality of switches to control the load, the load being switched to zero potential by two of the switching states, and relates to a device for carrying out the method.

2. Description of the Related Art

"Space vector pulse width modulation" SVPWM is often used to operate polyphase machines, which, on the one hand makes possible a relatively good degree of control, and on the other hand is relatively simple to implement. In particular, the control signals for the three half-bridges that are required for operating a polyphase machine are generated in this context. The signals between the three half-bridges are phase-shifted by 120°. The three half-bridges include six switches having 8 admissible discrete switching states, which emit periodic signals. Six of the switching states are active, i.e. they lead to a voltage. Two switching states are designated as null vectors and do not conduct any voltage to the load.

The maximum degree of control of the inverter, which is controlled by the SVPMW method, is limited by a nonideal hardware. In order for the curve of the switched voltage to be able to follow the control signal, in the case of real power switches, a minimum distance in time $t_{Min}$ is required between two switching processes of the same switch, whereby the maximum degree of modulation $A_{Max}$ is reduced to $$A_{Max}=(T_{PWM}-2*t_{Min})/T_{PWM}. \quad (1)$$

A null pointer that is to be present for a very short time, that is less than $t_{Min}$, can no longer be set.

BRIEF SUMMARY OF THE INVENTION

The present invention provides a method for optimizing the space vector pulse width modulation, in which the maximum degree of modulation is increased.

One essential aspect of the present invention is that one of the two switching states, that switch to zero potential, in the form of the null pointer is omitted. This has the advantage that one switch is not switched, whereby one switch-on process and one switch-off process are omitted. With that, the maximum degree of modulation $A_{MaxNew}$ is increased $$A_{Max\,New}=(T_{PWM}-t_{Min})/T_{PWM}. \quad (2)$$

The switching state that switches to zero potential is advantageously omitted in the middle of the PWM period. The switching state that switches to zero potential is extended at the beginning and at the end of each PWM period by that time which the switching state switching to zero potential (null pointer) would have required in the middle of the PWM period.

The minimum interval between two switching processes of the same switch is determined by the switch-on process and the subsequent switch-off process or vice versa, which, in turn, is specified by the real hardware used and its switching speeds, since the switching speed cannot be set to be infinitesimally short.

In a device for optimizing a space vector pulse width modulation, in which a voltage is connected to a load by combining discrete switching states of a plurality of switches to control the load, the load being switched to zero potential by two of the switching states, with the aid of which the maximum degree of modulation is to be increased, means being available which suppress at least one of the switching states that switches to zero potential, during the pulse width modulation period.

The times are first calculated according to space vector pulse width modulation SVPWM and then, either at all times or only upon the exceeding of the maximum degree of modulation achievable up to now, the null pointer in the middle of a PWM period is omitted and its time duration is added to the zero pointer at the beginning and at the end of the PWM period. The maximum achievable degree of modulation increases in both cases. In the first case, the switching losses are reduced by one-third. By contrast, it is ensured in the second case that the response in the modulation range, that was achievable up to now, remains unchanged.

DETAILED DESCRIPTION OF THE INVENTION

Figures 1, 2:
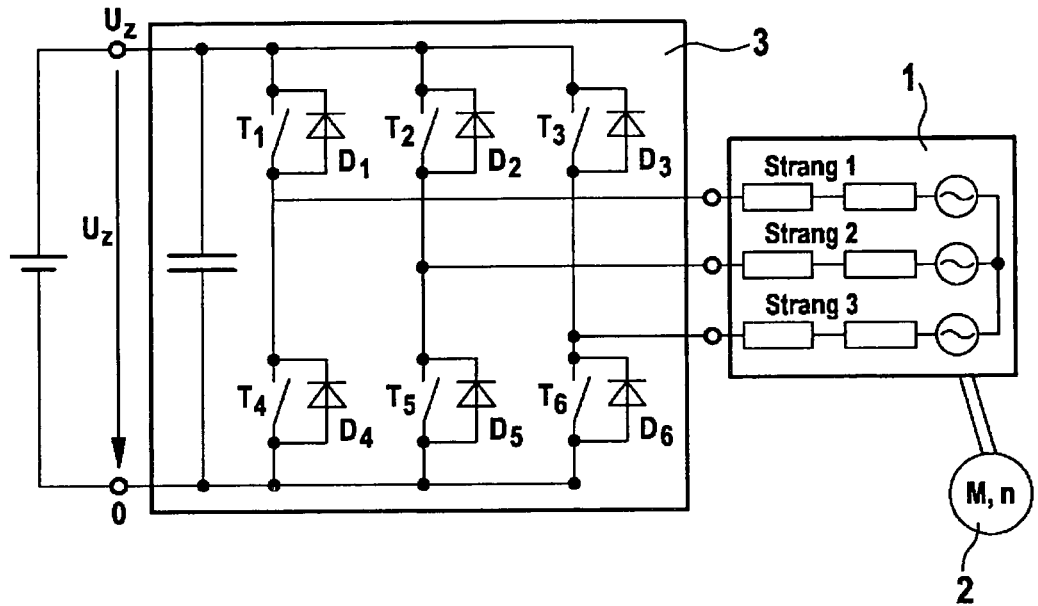
FIG. 1 shows a 3-phase inverter for controlling a polyphase machine.
FIG. 2 shows a table showing switching states of the switches used in the inverter according to FIG. 1.

FIG. 1 shows a polyphase machines 1 which is connected to a control unit 2, which controls torque m or rotational speed n of the polyphase machines 1. In addition, polyphase machines 1 is connected to a 3-phase inverter 3 as a power section, which has three half-bridges T1, T4; T2, T5 and T3, T6. Each half-bridge is connected to one phase of polyphase machines 1. Thus, phase 1 of polyphase machine 1 is connected to half-bridge T1, T4 of inverter 3. Phase 2 of polyphase machine 1 is at half-bridge T2, T4, while phase 3 leads to half-bridge T3, T6.

For the six switches T1, T2, T3, T4, T5 and T6 developed as power semiconductors there are eight admissible states, of which 6 are active states, which means that at these switching states a voltage is present at the individual phases of polyphase machines 1. The exact discrete switching states and the periodic voltage signals, present respectively at phases 1 to 3, may be inferred from the table of FIG. 2. The voltages at phases 1 to 3 are phase-shifted by 120°.

In the table, the "space vectors" are also given that are used according to the "space vector pulse width modulation". Besides the six active states, two null states 0 and 7 are also shown, which are designated as null vectors, and which supply no voltage to phases 1 to 3 of polyphase machines 1.

Figure 3:
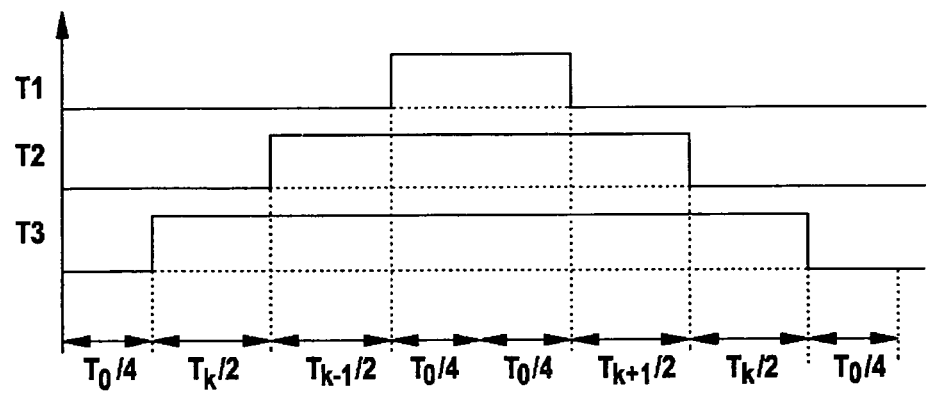
FIG. 3 shows control signals for switches T1, T2 and T3 according to the related art.

Now, in order to be able to set a desired voltage phasor, during a PWM period, an active state is set for a time $T_k$ and an adjacent active state is set for time $T_{k+1}$, so that between these two states only one switch has to be switched on and one switch has to be switched off. A null vector is set for the remaining time. In FIG. 3, in exemplary fashion, the control signals are shown for the three power semiconductors T1, T2 and T3 that are positioned at the top in the bridge branches. The control signals for lower three power semiconductors T4, T5 and T6 come about by inverting the signals shown.

Frequently, an interlocking time has to be maintained between the control signals, which is intended to prevent that, during the switching process, based on finite switching times, two of the switches, developed as power semiconductors, conduct briefly. Therefore, after the switching off of the upper power semiconductor, the lower power semiconductor is first switched on, delayed by the interlocking time, and similarly, after the switching off of the lower semiconductor, the upper one is switched on, delayed.

Times $T_0$, $T_k$ and $T_{k+1}$ are calculated by control unit 2, using the method of the space vector pulse width modulation (SVPWM method), $T_0$ standing for the control of a null pointer.

According to the related art, whose PWM period is shown in FIG. 3, power semiconductor T1 sets a null pointer for the time period of 2 ($T_0/4$). Power semiconductor T2 is activated for a time period of $T_{k+1}+T_0/2$, while power semiconductor T3 is switched to active for time period $T_k+T_{k+1}+T_0/2$. At the beginning and at the end of the PWM period, a null pointer is switched for the time period of $T_0/4$ in each case.

Consequently, according to the related art, a maximum degree of control of 96% comes about, calculated according to equation (1), for a PWM period duration of 100 μs and a minimum interval in time of 2 μs between two switching processes.

Figure 4:
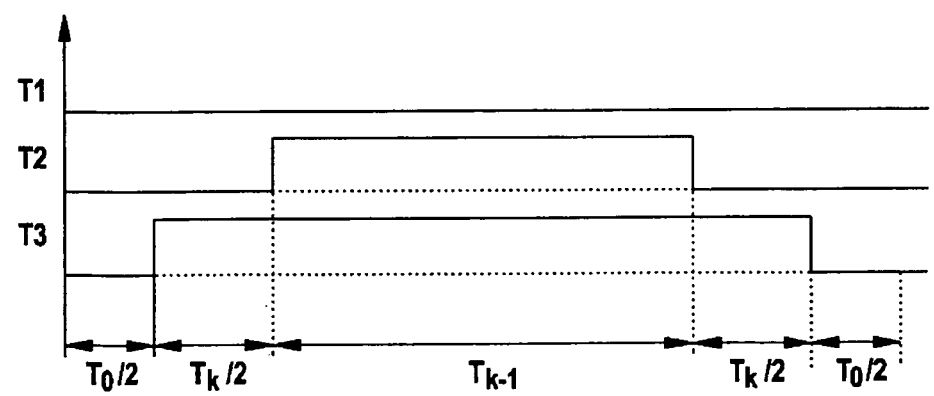
FIG. 4 shows control signals for switches T1, T2 and T3 according to an exemplary embodiment of the present invention.

As may be seen in FIG. 4, the null pointer now drops out in the middle of the PWM period. In one embodiment, this happens only when the desired degree of modulation exceeds the degree of modulation achievable by using the method up to now. For this, the null pointer is optionally extended either at all times or only upon the exceeding of the maximum degree of modulation up to now, at the beginning and at the end of each PWM period. This leads to modified control signals. Thus, one may do without a control of power semiconductor T1. The time period for the control signal for power semiconductor T2 now amounts to $T_{k+1}$, while the time period for power semiconductor T3 amounts to $T_{k+1}+T_k$ in this embodiment. The control using the null pointer at the beginning and at the end of the PWM period amounts to $T_0/2$ in each case, and is thus twice as large as in the example as in FIG. 3. That being the case, maximum degree of modification $A_{MaxNew}$ increases according to equation (2), since power semiconductor T1 was not activated, and a switching on and switching off sequence is omitted. The operating range that could not be set up to now is halved thereby.

Thus a maximum degree of modification $A_{MaxNew}$ of 98% comes about for a PWM period duration of 100 μs and a minimum interval in time of 2 μs between two switching processes, that is, the range that cannot be set is cut in half compared to the method according to the related art.

What is claimed is:

1. A method for optimizing a space vector pulse width modulation, comprising:
   connecting a selected voltage to a load;
   controlling the load by combining discrete switching states of a plurality of switches, wherein the load is switched to zero potential by two of the discrete switching states in normal operation, and wherein, during a pulse width modulation period, at least one of the two switching states for switching the load to zero potential is omitted and the other of the two switching states for switching the load to zero potential is active.

2. The method as recited in claim 1, wherein the at least one of the two switching states for switching the load to zero potential is omitted in the middle of the pulse width modulation period.

3. The method as recited in claim 2, wherein, at the end of the pulse width modulation period, the active state of the two switching states for switching the load to zero potential is extended.

4. The method as recited in claim 3, wherein a minimum interval between two switching processes of the same switch is determined by one of (i) a switching-on process and a subsequent switching-off process, or (ii) a switching-off process and a subsequent switching-on process.

5. A device for optimizing a space vector pulse width modulation, comprising:
   multiple switches configured to control a load, wherein a voltage is connected to the load, wherein the multiple switches control the load by combining discrete switching states of the multiple switches, wherein the load is switched to zero potential by two of the switching states in normal operation; and
   a control unit configured to suppress, during a pulse width modulation period, at least one of the two switching states for switching the load to zero potential.

* * * * *

UNITED STATES PATENT AND TRADEMARK OFFICE
CERTIFICATE OF CORRECTION

PATENT NO. : 8,441,818 B2  Page 1 of 1
APPLICATION NO. : 12/737352
DATED : May 14, 2013
INVENTOR(S) : Damson et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 321 days.

Signed and Sealed this
Eighth Day of September, 2015

Michelle K. Lee
*Director of the United States Patent and Trademark Office*